United States Patent Office 3,330,844
Patented July 11, 1967

3,330,844
CYCLOPENTADIENYL SULFONIC ACID AND SULFONYL HALIDE MANGANESE TRICARBONYLS
John Kozikowski, Walled Lake, Mich., and Michael Cais, Haifa, Israel, assignors to Ethyl Corporation, New York, N.Y., a corporation of Virginia
No Drawing. Original application Aug. 12, 1960, Ser. No. 49,135. Divided and this application May 13, 1963, Ser. No. 283,135
6 Claims. (Cl. 260—429)

This application is a division of application Ser. No. 49,135, filed Aug. 12, 1960, now abandoned.

This invention relates to a variety of organometallic compounds and the processes employed in their production. More specifically, this invention relates to compounds and processes involving the use of a cyclopentadienyl sulfonic acid manganese tricarbonyl compound.

An object of our invention is to provide new organometallic compounds and processes for their preparation. A further object is to provide cyclopentadienyl manganese tricarbonyl derivatives and processes for their preparation. Additional objects will become apparent from a reading of the specification and claims which follow.

The objects of this invention are accomplished by providing cyclopentadienyl sulfonic acid manganese tricarbonyls and cyclopentadienyl sulfonyl halide manganese tricarbonyls and other related compounds such as (sulfocyclopentadienyl)manganese tricarbonyl, (sulfocyclopentadienyl)manganese tricarbonyl-p-toluidine, and (potassium cyclopentadienyl sulfonate) manganese tricarbonyl and processes for preparing said compounds.

A first feature of our invention involves the sulfonation of cyclopentadienyl manganese tricarbonyl compounds according to the following reaction:

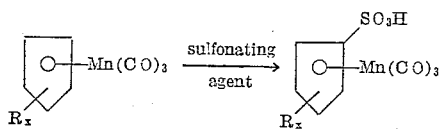

The cyclopentadienyl sulfonic acid manganese tricarbonyl compound is easily separated from the reaction mixture by treating the reaction mixture with a basic material which forms an insoluble salt of the sulfonic acid. In the above reaction, the cyclopentadienyl group may be substituted with R groups which are univalent hydrocarbons containing from one to about eight carbon atoms. "x" is an integer ranging from zero to three. The reaction conditions are not critical, although preferably the reaction is performed below about 60° C. A preferred form of this reaction is set forth in the following example in which all parts and percentages are by weight unless otherwise indicated.

Example I

To a suspension of cyclopentadienylmanganese tricarbonyl (306 g., 1.5 moles) in acetic anhydride (400 ml.) there was added dropwise over one hour with continuous stirring 100 percent sulfuric acid (220 g., 2.2 moles) keeping the temperature at 25–30°. As the addition of sulfuric acid proceeded, all the solid went into solution and the latter became very dark. Stirring was continued at room temperature, for two hours after the addition was completed and then, after raising the temperature to 60°, for one hour at 55–60°.

The cooled mixture was poured over ice, allowed to stand for one hour and then filtered. A small amount (5 g.) of insoluble precipitate was collected which was shown by melting point and infrared spectrum to be the starting material. The dark colored filtrate (2 liters) was mixed with a solution of p-toluidine (170 g.) in water (700 ml.) and conc. hydrochloric acid (150 ml.). A cream-colored precipitate which was the (sulfocyclopentadienyl) manganese tricarbonyl-p-toluidine salt, formed instantaneously. This was filtered, washed with ice-water and air dried to yield a solid (540 g., 93 percent yield) of M.P. 204–207°.

Recrystallization from absolute ethanol afforded the analytical sample, pale yellow needles of M.P. 209–210°.

*Analysis.*—Calcd. for $C_{15}H_{14}MnNO_6S$: C, 46.0; H, 3.60; Mn, 14.0; S, 8.22. Found: C, 46.4; H, 3.88; Mn, 13.7; S, 8.56.

In another experiment, under slightly different conditions, 32 percent of the starting material was recovered, and the yield of the (sulfocyclopentadienyl) manganese tricarbonyl-p-toluidine salt, calculated on reacted material, was quantitative.

The cyclopentadienyl sulfonic acid manganese tricarbonyl compound can be separated from the p-toluidine salt in Example I by treating the salt with sulfuric acid. The liquid mixture which is formed is decanted to remove the solution from the sulfonic acid product which, when dried under reduced pressure, yields pure cyclopentadienyl sulfonic acid manganese tricarbonyl.

A wide variety of sulfonic acid salts of a cyclopentadienyl sulfonic acid manganese tricarbonyl can be made according to our invention. This is accomplished by treating the sulfonic acid with a base, or, for example, by treating the p-toluidine salt obtained in Example I with a base which is stronger than p-toluidine. Typical of such bases are sodium hydroxide, lithium hydroxide, potassium hydroxide and the like. To illustrate, there is presented the following example.

Example II

The cyclopentadienyl sulfonic acid manganese tricarbonyl p-toluidine salt obtained in Example I was heated for a short time with an aqueous solution of potassium hydroxide after which it was filtered, cooled, and the filtrate was saturated with potassium chloride. The potassium salt of cyclopentadienyl sulfonic acid manganese tricarbonyl salted out as pale yellow plates. Heating to 260° C. did not melt the crystals. They were recrystallized from ethanol to give an analytical sample. Found: C, 29.8; H, 1.34; Mn, 16.9; S, 10.1 percent. Calculated for $C_8H_4KMnO_6S$: C, 29.8; H, 1.21; Mn, 17.1; S, 9.94 percent.

Another facet of our invention involves the reaction of a cyclopentadienyl sulfonic acid manganese tricarbonyl compound or its salt with a halogenating agent such as phosphorus pentachloride, thionyl chloride or benzotrichloride. There is produced the corresponding cyclopentadienyl sulfonyl halide manganese tricarbonyl. The reaction for the salt can be illustrated as follows:

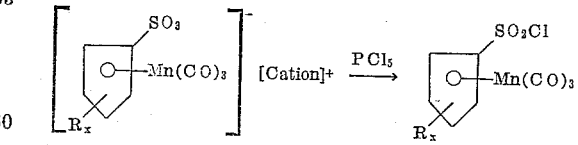

Although the reaction conditions are not critical, the temperature employed preferably ranges from about room temperature to about 100° C. Although not necessary, an inert solvent can be employed if desired. To further illustrate this aspect of our invention, there is presented the following example in which all parts and percentages are by weight unless otherwise indicated.

Example III

A mixture of crude, dry (sulfocyclopentadienyl) manganese tricarbonyl-p-toluidine salt (70 g.) and phosphorus pentachloride (70 g.) was stirred vigorously for ten minutes at room temperature; heat was evolved and a viscous liquid was formed. The mixture was then heated gently, with stirring, on the steam bath for 45 minutes. After cooling, benzene (500 ml.) was added to the reaction mixture, stirred well and poured over ice; allowed to stand for one hour and filtered. The benzene layer was separated, washed once with water, mixed with anydrous sodium sulfate and activated charcoal (Norit-A, Pfanstiehl Chemical Co.) allowed to stand for 30 minutes and filtered. The benzene solution was concentrated to a small volume, diluted with petroleum ether and the precipitate formed was filtered off to collect 54 g. of yellow crystals (quantitative yield) of M.P. 95–105°.

One recrystallization from carbon tetrachloride afforded the analytical sample, M.P. 112–113°, of (chlorosulfonyl cyclopentadienyl) manganese tricarbonyl.

*Analysis.*—Calcd. for $C_8H_4ClMnO_5S$: C, 31.7; H, 1.33; Mn, 18.1; S, 10.5. Found: C, 31.6; H, 1.38; Mn, 17.8; S, 10.7.

A further form of our invention involves the reaction of a cyclopentadienyl sulfonyl halide manganese tricarbonyl, as illustrated in the previous example, with a primary or secondary amine. The reaction conditions employed are not critical, and the temperature and pressure used are dependent on the nature of the amine reactant. Thus, if the amine reactant is a gas as in the case of dimethylamine or nitrogen, the reaction is performed under pressure and at a relatively low temperature. On the other hand, with an amine which is a high boiling liquid, the reaction is performed at higher temperatures, and pressure is not necessary. Preferably, moisture is excluded from the reaction mixture since it tends to decrease the yield by reacting with the sulfonyl halide reactant. As an illustration of this form of our invention, there is presented the following example.

*Example IV*

The (cyclopentadienyl sulfonyl chloride) manganese tricarbonyl compound of Example III (3 gm.) and p-toluidine (3 gm.) were mixed together and heated on a steam bath until a melt was formed. Ethanol (50 ml.) was then added, the mixture heated to reflux for 15 minutes, cooled, diluted with potassium hydroxide aqueous solution and filtered. The filtrate was acidified with hydrochloric acid and the precipitate formed collected by filtration. Yield 2 g. of yellow powder, M.P. 197–199° which was [(p-tolylsulfamoyl) cyclopentadienyl] manganese tricarbonyl. One crystallization from ethanol afforded yellow crystals, M.P. 199–201°.

*Analysis.*—Calcd. for $C_{15}H_{12}MnNO_5S$: C, 48.2; H, 3.27; Mn, 14.7; S, 8.6. Found: C, 48.5; H, 3.39; Mn, 14.5; S, 9.2.

The preparation of other related cyclopentadienyl manganese tricarbonyl compounds is fully described in our copending application Ser. No. 283,139 and Ser. No. 283,140, filed May 13, 1963, now respectively U.S. Patent Nos. 3,205,245 and 3,205,246, issued Sept. 7, 1965.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram in dried for one hour in an oven at 150° C. It is then placed in a tube which is devoid of air and there is added to the tube 0.5 gram of [(methylsulfonyl)cyclopentadienyl] manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:
1. Compounds having the formula:

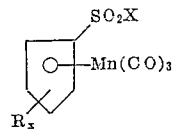

wherein R is a hydrocarbon group containing from one to about 8 carbon atoms, x is an integer ranging from 0 to 3 and X is a halogen.

2. (Chlorosulfonyl cyclopentadienyl)manganese tricarbonyl.

3. Compounds having the formula:

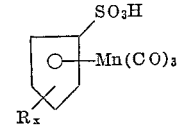

in which R is a univalent hydrocarbon containing from one to about 8 carbon atoms and x is an integer ranging from 0 to 3.

4. (Sulfocyclopentadienyl) manganese tricarbonyl.

5. (Sulfocyclopentadienyl) manganese tricarbonyl-p-toluidine.

6. (Potassium cyclopentadienylsulfonate) manganese tricarbonyl.

References Cited

UNITED STATES PATENTS 3,028,406   4/1962   Brantley _____ 260—429

(Other references on following page)

FOREIGN PATENTS 572,013   3/1959   Canada.

OTHER REFERENCES

Cais et al.: Chemistry and Industry (Feb. 20, 1960), p. 202.

Cotton et al.: Chemistry and Industry (1958), pp. 1368–9.

Kozikowski et al.: Jour. Am. Chem. Soc., vol. 81 (1959), pp. 2995–7.

Karrer: Organic Chemistry, Elsevier Publishing Company, Inc., New York, N.Y., 2nd Edition (1946), p. 407.

HELEN M. McCARTHY, *Primary Examiner.*

TOBIAS E. LEVOW, *Examiner.*

A. P. DEMERS, *Assistant Examiner.*